(12) United States Patent
Takahashi et al.

(10) Patent No.: US 12,315,876 B2
(45) Date of Patent: *May 27, 2025

(54) SULFIDE-BASED SOLID ELECTROLYTE PARTICLES

(71) Applicant: Mitsui Mining & Smelting Co., Ltd., Tokyo (JP)

(72) Inventors: Tsukasa Takahashi, Ageo (JP); Takashi Chikumoto, Ageo (JP); Takahiro Ito, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 50 days.

This patent is subject to a terminal disclaimer.

(21) Appl. No.: 17/453,930

(22) Filed: Nov. 8, 2021

(65) Prior Publication Data

US 2022/0059870 A1 Feb. 24, 2022

Related U.S. Application Data

(63) Continuation of application No. 16/979,920, filed as application No. PCT/JP2019/009847 on Mar. 12, 2019, now Pat. No. 11,688,879.

(30) Foreign Application Priority Data

Mar. 12, 2018 (JP) .................................. 2018-044210

(51) Int. Cl.
*H01M 10/00* (2006.01)
*H01B 1/10* (2006.01)
(Continued)

(52) U.S. Cl.
CPC .......... *H01M 10/0562* (2013.01); *H01B 1/10* (2013.01); *H01M 4/13* (2013.01);
(Continued)

(58) Field of Classification Search
CPC .. H01M 10/0562; H01M 4/13; H01M 10/052; H01M 10/0525; H01M 2004/027;
(Continued)

(56) References Cited

U.S. PATENT DOCUMENTS 9,899,701 B2 2/2018 Miyashita et al.
9,899,702 B2 2/2018 Miyashita et al.
(Continued)

FOREIGN PATENT DOCUMENTS

EP 31714444 A1 5/2017
EP 3240089 A1 11/2017
(Continued)

OTHER PUBLICATIONS

Hans-Jorg Deiseroth et al. Li6PS5X: A Class of Crystalline Li-Rich Solids with an Unusually High Li+ Mobility. Angew. Chem. Int. Ed. 2008, 47, 755-758.

*Primary Examiner* — Nicholas P D'Aniello
(74) *Attorney, Agent, or Firm* — The Webb Law Firm

(57) ABSTRACT

A sulfide-based solid electrolyte particle having a crystal phase of a cubic argyrodite-type crystal structure composed of Li, P, S and a halogen (Ha), wherein good contact between the sulfide-based solid electrolyte particles and positive or negative electrode active material particles is secured and improvements in the rate characteristic and the cycle characteristic are attained. The ratio ($Z_{Ha2}/Z_{Ha1}$) of an element ratio $Z_{Ha2}$ of the halogen (Ha) at the position of 5 nm in depth from the particle surface to an element ratio $Z_{Ha1}$ of the halogen (Ha) at the position of 100 nm in depth from the particle surface is 0.5 or lower and the ratio ($Z_{O2}/Z_{A2}$) of an element ratio $Z_{O2}$ of oxygen to the total $Z_{A2}$ of element ratios of P, S, O, and the halogen (Ha) at the position of 5 nm in depth from the particle surface is 0.5 or higher, as measured by XPS.

11 Claims, 1 Drawing Sheet

(51) Int. Cl.
*H01M 4/13* (2010.01)
*H01M 10/052* (2010.01)
*H01M 10/0525* (2010.01)
*H01M 10/0562* (2010.01)
*H01M 4/02* (2006.01)

(52) U.S. Cl.
CPC ..... *H01M 10/052* (2013.01); *H01M 10/0525* (2013.01); *H01M 2004/027* (2013.01); *H01M 2004/028* (2013.01)

(58) Field of Classification Search
CPC ... H01M 2004/028; H01M 2300/0068; H01M 2300/0091; H01M 4/62; H01B 1/10; H01B 1/06; C01P 2002/30; C01P 2002/85; C01P 2004/51; C01P 2004/61; C01P 2004/62; C01P 2006/40; C01D 15/00; C01B 25/14; Y02E 60/10
See application file for complete search history.

(56) References Cited

U.S. PATENT DOCUMENTS

| | | | |
|---|---|---|---|
| 10,388,986 | B2 | 8/2019 | Sasaki et al. |
| 2014/0093785 | A1* | 4/2014 | Sugiura ............... H01M 10/056 429/315 |
| 2015/0349379 | A1 | 12/2015 | Hozumi et al. |
| 2016/0164136 | A1* | 6/2016 | Higuchi ............ H01M 10/0525 429/323 |
| 2017/0133717 | A1* | 5/2017 | Makino ............. H01M 10/0562 |
| 2017/0222257 | A1 | 8/2017 | Miyashita et al. |
| 2017/0331149 | A1 | 11/2017 | Sasaki et al. |
| 2017/0352916 | A1 | 12/2017 | Miyashita et al. |
| 2018/0062166 | A1 | 3/2018 | Sasaki |
| 2018/0175447 | A1 | 6/2018 | Kanno et al. |
| 2018/0316057 | A1 | 11/2018 | Sasaki |
| 2019/0081352 | A1 | 3/2019 | Sasaki et al. |
| 2019/0312304 | A1 | 10/2019 | Uesugi et al. |

FOREIGN PATENT DOCUMENTS

| | | |
|---|---|---|
| JP | 2012-94445 A | 5/2012 |
| JP | 2015-225776 A | 12/2015 |
| JP | 2016-24874 A | 2/2016 |
| JP | 2018-26321 A | 2/2018 |
| JP | 2018-32621 A | 3/2018 |
| JP | 2018-186077 A | 11/2018 |
| JP | 2019-50182 A | 3/2019 |
| WO | 2016/009768 A1 | 1/2016 |
| WO | 2016/104702 A1 | 6/2016 |
| WO | 2018/003333 A1 | 1/2018 |

* cited by examiner

SULFIDE-BASED SOLID ELECTROLYTE PARTICLES

CROSS-REFERENCE TO RELATED APPLICATIONS

This application is a continuation of U.S. patent application Ser. No. 16/979,920 filed on Sep. 11, 2020, which is the United States national phase of International Application No. PCT/JP2019/009847 filed Mar. 12, 2019, and claims priority to Japanese Patent Application No. 2018-044210 filed Mar. 12, 2018, the disclosures of which are hereby incorporated by reference in their entirety.

BACKGROUND OF THE INVENTION

Technical Field

The present invention relates to a sulfide-based solid electrolyte particle to be suitably used as a solid electrolyte of a lithium secondary battery, wherein the sulfide-based solid electrolyte particle has a crystal phase of a cubic argyrodite-type crystal structure composed of lithium (Li), phosphorus (P), sulfur(S) and a halogen (Ha).

Background Art

Lithium secondary batteries are secondary batteries having a structure in which during charging, lithium dissolves out as lithium ions from their positive electrode and migrates to and is intercalated in their negative electrode, and during discharging, conversely lithium ions return from the negative electrode to the positive electrode. Lithium secondary batteries, which have features such as a high energy density and a long life, are broadly used as power sources for household appliances such as a video camera, portable electronic devices such as laptop computers and cell phones, electric tools such as power tools, and have recently been applied as large batteries mounted on electric vehicles (EV), hybrid electric vehicles (HEV) and the like.

The lithium secondary batteries of this kind are constituted of a positive electrode, a negative electrode and an ionic conduction layer interposed between both the electrodes, wherein for the ionic conduction layer, a separator is usually used which is composed of a porous film of polyethylene, polypropylene or the like filled with a nonaqueous electrolyte solution. However, since an organic electrolyte solution using a combustible organic solvent as its solvent is used as the electrolyte as mentioned above, not only there is a need of improvement in terms of the structure and material to prevent volatilization and leakage thereof, but also there are needs of installation of a safety device to suppress a temperature rise in short circuit and improvement in terms of the structure and material to prevent short circuit.

By contrast, all-solid-state lithium secondary batteries in which a battery is fully solidified using a solid electrolyte using lithium sulfide ($Li_2S$) or the like as a starting material and no combustible organic solvent is used can attain simplification of a safety device and moreover can be excellent in the production cost and the productivity. Further the all-solid-state lithium secondary batteries are also characterized by that they are capable of attaining a higher voltage by stacking in series in their cell, and moreover can be expected to lead to improvements in safety and durability, such as side reactions due to migration of anions do not occur because no ions excluding Li ions migrate in the solid electrolyte of this kind.

The solid electrolyte to be used in such batteries is demanded to be as high as possible in the ionic conductivity and to be chemically and electrochemically stable, and there are known as candidate materials, for example, lithium halides, lithium nitride, lithium oxyacid salts and derivatives thereof.

With regard to a solid electrolyte of this kind, there is disclosed, for example, in International Patent Application No. WO 2016/104702, a compound having a cubic argyrodite-type crystal structure and represented by the composition formula (1): $Li_{7-x+y}PS_{6-x}Cl_{x+y}$.

Further in Japanese Patent Laid-open No. 2016-24874, there is disclosed a sulfide-based solid electrolyte containing a compound having a cubic argyrodite-type crystal structure and represented by the composition formula (2): $Li_{7-x-2y}PS_{6-x-y}Cl_x$ wherein $0.8 \leq x \leq 1.7$ and $0 < y \leq -0.25x+0.5$ are satisfied in the composition formula (2).

Further in Japanese Patent Laid-open No. 2012-94445, the following proposition is disclosed: by suitably repeating a treatment involving, for example, of drying the surface of sulfide-based solid electrolyte particles after exposure to the air, an oxide layer is formed on the surface of the sulfide-based solid electrolyte particles to thereby prevent the sulfide-based solid electrolyte particles from contacting with an oxide active material and thus suppress the formation of high-resistance sites on the sulfide-based solid electrolyte particle surface.

SUMMARY OF THE INVENTION

Sulfide-based compounds having a cubic argyrodite-type crystal structure are characterized by that they are high in crystallinity and excellent in ionic conductivity, but hard. Among these, sulfide-based compounds having a cubic argyrodite-type crystal structure containing a halogen (Ha), which are characterized by that they are particularly hard, has difficulty in securing good contact with positive electrode active material particles or negative electrode active material particles, and has difficulty in promoting good mutual diffusion of lithium ions, which is a problem on enhancement of the rate characteristic and the cycle characteristic.

Then, the present invention relates to a sulfide-based solid electrolyte particle having a crystal phase of a cubic argyrodite-type crystal structure composed of lithium (Li), phosphorus (P), sulfur(S) and a halogen (Ha), and intends to provide the novel sulfide-based solid electrolyte particle capable of securing a good contact state with positive electrode active material particles or negative electrode active material particles and capable of further improving the rate characteristic and the cycle characteristic.

The present invention provides the sulfide-based solid electrolyte particle having a crystal phase of a cubic argyrodite-type crystal structure composed of lithium (Li), phosphorus (P), sulfur(S) and a halogen (Ha), wherein the ratio $(Z_{Ha2}/Z_{Ha1})$ of an element ratio $Z_{Ha2}$ of the halogen (Ha) at the position (in terms of $SiO_2$ sputter rate) of 5 nm in depth from the particle surface to an element ratio $Z_{Ha1}$ of the halogen (Ha) at the position (in terms of $SiO_2$ sputter rate) of 100 nm in depth from the particle surface is 0.5 or lower, as measured by XPS (X-ray photoelectron spectroscopy), and the ratio $(Z_{O2}/Z_{A2})$ of an element ratio $Z_{O2}$ of oxygen at the position (in terms of $SiO_2$ sputter rate) of 5 nm in depth from the particle surface to the total $Z_{A2}$ of element ratios of phosphorus (P), sulfur(S), oxygen (O) and the halogen (Ha) at the position is 0.5 or higher, as measured by XPS.

Hereinafter, the position of 5 nm or the position of 100 nm in depth from the particle surface means a depth in terms of $SiO_2$ sputter rate.

The sulfide-based solid electrolyte particle proposed by the present invention has a raised oxygen concentration in the particle surface and, on the other hand, has a lower halogen (Ha) concentration in the particle surface than in the particle inside. Thus, the sulfide-based solid electrolyte particle can secure a good contact state with positive electrode active material particles or negative electrode active material particles and can improve the rate characteristic and the cycle characteristic. A good contact state with positive electrode active material particles or negative electrode active material particles can be secured probably because the surface of the particles is soft due to the raised oxygen concentration in the particle surface and, on the other hand, the lower halogen (Ha) concentration in the particle surface than that in the particle inside.

DESCRIPTION OF THE INVENTION

Figure 1:
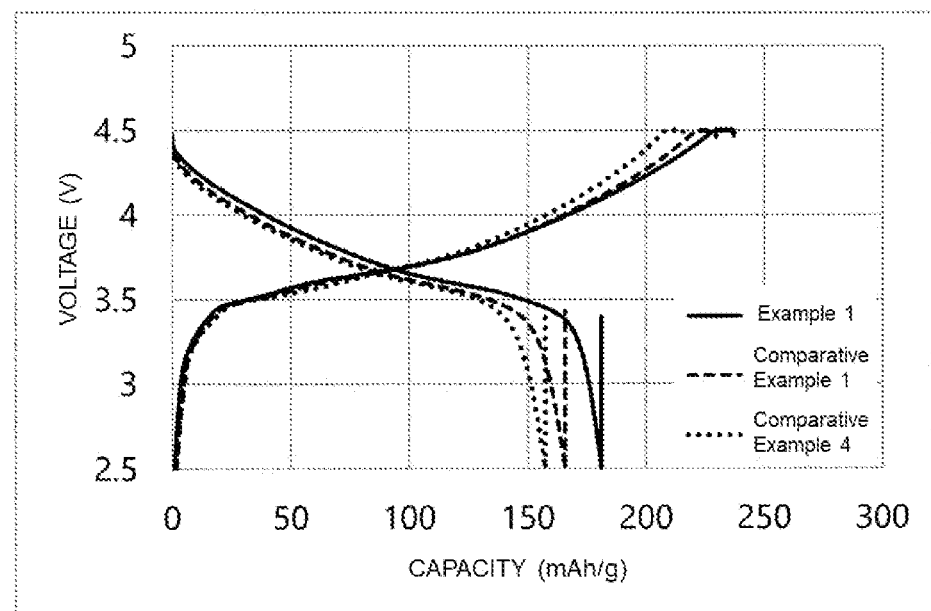
FIG. 1 is initial charge and discharge curves of samples obtained in Example 1, Comparative Example 1 and Comparative Example 4.

Then, the present invention will be described based on embodiments. However, the present invention is not limited to the following embodiments.

<Present Solid Electrolyte Particle>

A sulfide-based solid electrolyte particle according to the present embodiment (also referred to as "the present solid electrolyte particle") is a particle having a crystal phase of a cubic argyrodite-type crystal structure composed of lithium (Li), phosphorus (P), sulfur(S) and a halogen (Ha).

It is better that the present solid electrolyte particle has a lower element ratio of a halogen (Ha) in the particle surface than that in the particle inside, and therefore it is preferable that the ratio ($Z_{Ha2}/Z_{Ha1}$) of an element ratio $Z_{Ha2}$ of the halogen (Ha) at the position of 5 nm in depth from the particle surface to an element ratio $Z_{Ha1}$ of the halogen (Ha) at the position of 100 nm in depth from the particle surface be 0.5 or lower as measured by XPS; the ratio is more preferably 0.50 or lower among others, 0.01 or higher or 0.4 or lower among others, 0.40 or lower among others, 0.05 or higher or 0.3 or lower among others, and 0.30 or lower among others.

Further, it is preferable that the present solid electrolyte particle have a relatively low element ratio of the halogen (Ha) in the particle surface in all the constituent elements in the particle surface, and therefore it is preferable that the ratio ($Z_{Ha2}/Z_{A2}$) of the element ratio $Z_{Ha2}$ of the halogen (Ha) at the position of 5 nm in depth from the particle surface to the total $Z_{A2}$ of element ratios of phosphorus (P), sulfur(S), oxygen (O) and the halogen (Ha) at the position be 0.1 or lower, as measured by XPS; the ratio is more preferably 0.10 or lower among others, 0.01 or higher or 0.08 or lower among others, and 0.02 or higher or 0.05 or lower among others.

At this time, since the present solid electrolyte particle has a halogen (Ha) in a certain amount in the particle inside, it is preferable that the ratio ($Z_{Ha1}/Z_{A1}$) of an element ratio $Z_{Ha1}$ of the halogen (Ha) at the position of 100 nm in depth from the particle surface to the total $Z_{A1}$ of element ratios of phosphorus (P), sulfur(S), oxygen (O) and the halogen (Ha) at the position be 0.03 to 0.3, as measured by XPS; the ratio is more preferably 0.30 or lower among others, 0.04 or higher or 0.25 or lower among others, 0.2 or lower among others, and 0.20 or lower among others.

Among sulfide-based compound particles having a cubic argyrodite-type crystal structure, a sulfide-based compound particle having a cubic argyrodite-type crystal structure containing a halogen (Ha), which is characterized by that it is particularly hard, has difficulty in securing good contact with positive electrode active material particles or negative electrode active material particles, and has difficulty in promoting good mutual diffusion of lithium ions, which is a problem on enhancement of the rate characteristic and the cycle characteristic. Then, in the present solid electrolyte particle, by making the concentration of a halogen (Ha) in the vicinity of the particle surface to be lowered as described above, a good contact state can be secured between the present solid electrolyte particle and positive electrode active material particles or negative electrode active material particles, and the rate characteristic and the cycle characteristic can be enhanced.

Further, in view of making relatively low the element ratio of a halogen (Ha) in the particle surface, it is better that the present solid electrolyte particle has a higher oxygen ratio in the particle surface than usually, and therefore it is preferable that the ratio ($Z_{O2}/Z_{A2}$) of an element ratio $Z_{O2}$ of oxygen at the position of 5 nm in depth from the particle surface to the total $Z_{A2}$ of element ratios of phosphorus (P), sulfur(S), oxygen (O) and a halogen (Ha) at the position be 0.5 or higher, as measured by XRS; the ratio is more preferably 0.50 or higher among others, 0.6 or higher or 1.0 or lower among others, 0.60 or higher among others, 0.8 or higher among others, and 0.80 or higher among others.

At this time, in view of securing the electroconductivity, it is better that the present solid electrolyte particle has a lower oxygen ratio in the particle inside, and therefore it is preferable that the ratio ($Z_{O1}/Z_{A1}$) of the element ratio $Z_{O1}$ of oxygen at the position of 100 nm in depth from the particle surface to the total $Z_{A1}$ of element ratios of phosphorus (P), sulfur(S), oxygen (O) and a halogen (Ha) at the position be lower than 0.3, as measured by XPS; the ratio is more preferably 0.001 or higher or 0.2 or lower among others, 0.20 or lower among others, and 0.01 or higher among others.

In the present solid electrolyte particle, it is confirmed that by making the concentration of the halogen (Ha) in the vicinity of the particle surface to be lowered as described above, the rate characteristic and the cycle characteristic can be enhanced even if the electroconductivity is lowered.

Here, it is considered that in the case of adopting a production method described later, the oxygen present in the surface of the present solid electrolyte particle is oxygen derived from moisture, and therefore it can be presumed that much oxygen existing as OH group is contained.

As a means to raise the oxygen concentration in the vicinity of the particle surface of the present solid electrolyte particle and, on the other hand, to lower the halogen (Ha) concentration in the vicinity of the particle surface thereof as described above, methods including exposing the solid electrolyte particle in an atmosphere containing a predetermined amount of moisture, that is, an atmosphere having a dew point in the predetermined range, for a predetermined time, and carrying out no drying treatment can be listed. However, means thereof is not limited to such a method.

The inventors have been examined the halogen (Ha) concentration and the oxygen concentration in the position of 5 nm in depth from the particle surface and not those in the outermost surface of the particle. The reason for this is because the outermost surface of the particle is under the large influence of extrinsic factors such as the exposure condition, and therefore the above concentrations are specified so that such an influence is little and that the feature of the present solid electrolyte particle is indicated.

It is preferable that the present solid electrolyte particle contain, as a main phase, a compound having a crystal phase of a cubic argyrodite-type crystal structure and represented by the composition formula (1): $Li_{7-x}PS_{6-x}Ha_x$. At this time, providing that the present solid electrolyte particle contains the crystal phase of a cubic argyrodite-type crystal structure as a main phase, it is acceptable that the present solid electrolyte particle contains oxygen (O), a small amount of hetero-phases, and the like. The content of the hetero-phases may be a level that is not affect the property of the present solid electrolyte particle, and is, specifically, lower than 10% by mass, preferably lower than 5% by mass and especially preferably lower than about 3% by mass.

Here, the "main phase" in the present solid electrolyte particle means a phase, that is, a compound, contained in the largest amount in terms of a molar ratio in the present solid electrolyte particle.

In the above composition formula (1), the Ha element includes fluorine (F), chlorine (Cl), bromine (Br) and iodine (I), and these may be used singly or in a combination of two or more.

In the above composition formula (1), x indicating the content of an Ha element is preferably 0.2 to 1.8. With x within 0.2 to 1.8, to make the cubic argyrodite-type crystal structure is easy, and the lithium ion conductivity can be raised because the formation of impurity phases can be suppressed.

In view of this, x is preferably 0.2 to 1.8 and especially preferably 0.6 or higher or 1.6 or lower among others.

Among the above, in the case where Ha in the composition formula (1) is Cl or Br, x is preferably 0.4 or higher, and especially preferably 0.6 or higher or 1.6 or lower among others, and particularly 0.8 or higher or 1.2 or lower among others.

In view of simultaneously providing both the ionic conductivity and the softness, the Ha element may be a combination of chlorine (Cl) and bromine (Br). In this case, the present solid electrolyte particle is a compound represented by the composition formula (2): $Li_{7-x}PS_{6-x}Cl_yBr_z$.

In the above composition formula (2), it is preferable that the total molar ratio x (=y+z) of Cl and Br satisfy $1.0<x\leq1.8$.

When the total molar ratio x (=y+z) of Cl and Br is higher than 1.0 and 1.8 or lower, the ionic conductivity can be raised more, which is preferable. Particularly when x is 1.8 or lower, the formation of hetero-phases can be controlled and the lowering in the ionic conductivity can be suppressed.

In view of this, x in the composition formula (2) is preferably higher than 1.0 and 1.8 or lower, and more preferably 1.1 or higher or 1.7 or lower among others, and 1.2 or higher or 1.6 or lower among others.

In the composition formula (2), it is preferable that the proportion (z/y) of the molar ratio of Br to the molar ratio of Cl be 0.1 to 10.

When the proportion (z/y) of the molar ratio of Br to the molar ratio of Cl is 0.1 or higher, the elastic modulus of the solid electrolyte is low, which is preferable; and on the other hand, when the proportion (z/y) is 10 or lower, the ionic conductivity is high, which is preferable.

In view of this, in the composition formula (2), the proportion (z/y) of the molar ratio of Br to the molar ratio of Cl is preferably 0.1 to 10, and more preferably 0.2 or higher or 5 or lower among others, and 0.3 or higher or 3 or lower among others.

(Particle Diameter)

The present solid electrolyte containing the present solid electrolyte particle is an aggregate of particles, and $D_{50}$ of the present solid electrolyte, that is, $D_{50}$ in a volume particle size distribution obtained by a laser diffraction/scattering particle size distribution measurement method (referred to as "average particle diameter ($D_{50}$)" or "$D_{50}$"), is preferably 0.1 μm to 10 μm.

When $D_{50}$ is 0.1 μm or larger, there are no resistance increase due to the increase in the surface area of the solid electrolyte particle and no difficulty in mixing with an active material, which is preferable. On the other hand, when $D_{50}$ is 10 μm or smaller, it is easy for the present solid electrolyte to go into gaps in the particles of the active material and another solid electrolyte used in combination and the contact points and the contact area are thus large, which is preferable.

In view of these, the average particle diameter ($D_{50}$) of the present solid electrolyte is preferably 0.1 μm to 10 μm, and more preferably 0.3 μm or larger or 7 μm or smaller among others, and particularly 0.5 μm or larger or 5 μm or smaller among others.

<Method for Producing the Present Solid Electrolyte Particle>

Then, one example of a method for producing the present solid electrolyte particle will be described. The production method to be described herein, however, is just an illustrative example, and a production method is not limited thereto.

The present solid electrolyte particle can be obtained by providing a solid electrolyte particle having a crystal phase of a cubic argyrodite-type crystal structure composed of lithium (Li), phosphorus (P), sulfur(S) and a halogen (Ha) (referred to as "raw solid electrolyte particle"), and carrying out a "surface modification treatment" on the raw solid electrolyte particle, specifically, carrying out exposure of the raw solid electrolyte particle to an atmosphere having a dew point in the predetermined range for a predetermined time and carrying out no drying treatment, as described above. A production method described herein is just an illustrative example, and a production method is not limited thereto.

(Raw Solid Electrolyte Particle)

A method of providing the raw solid electrolyte particle is arbitrary. The raw solid electrolyte particle may be purchased or may be produced.

Here, one example of a method for producing the raw solid electrolyte particle will be described. However, a method for producing the raw solid electrolyte particle is arbitrary.

The raw solid electrolyte particle can be obtained, for example, by weighing a lithium sulfide ($Li_2S$) powder, a phosphorus sulfide ($P_2S_5$) powder, and a lithium chloride (LiCl) powder or a lithium bromide (LiBr) powder, crushing and mixing the resultant with a ball mill, a bead mill, a homogenizer or the like, drying the resultant as required, then firing the resultant in an inert atmosphere or a circulation of hydrogen sulfide gas ($H_2S$), disintegrating and crushing the resultant as required, and classifying the resultant as required.

At this time, if crushing and mixing is very strong mechanical crushing and mixing according to, for example, a mechanical alloying method, the reduction in crystallinity or the amorphization of the raw material powders or the homogenization of the raw material mixed powder occurs; in this case, the bond scission between the cation and sulfur is caused, and sulfur escapes in firing to resultantly generate sulfur deficiencies and develop electron conductivity. Hence, it is desirable that the crushing and mixing be those capable of maintaining crystallinity of the raw material powders.

As described above, the raw solid electrolyte particle having almost no sulfur deficiency can be fabricated by firing in an inert atmosphere or in a circulation of hydrogen sulfide gas ($H_2S$) at 350° C. or higher.

In the case of using hydrogen sulfide gas among these in firing, sulfur gas formed by decomposition of hydrogen sulfide in firing can raise the sulfur partial pressure in the vicinity of a firing material. Therefore, sulfur deficiencies are hardly formed even at a high firing temperature and the electron conductivity can be thus lowered. In the case of firing in an atmosphere containing hydrogen sulfide gas, the firing temperature is preferably 350 to 650° C., and especially preferably 450° C. or higher or 600° C. or lower among others, and 500° C. or higher or 550° C. or lower among others.

On the other hand, in the case of firing in an inert atmosphere, for example, Ar, the sulfur partial pressure in the vicinity of the firing material in firing cannot be raised unlike the case of hydrogen sulfide gas. Resultantly, sulfur deficiencies are easily formed at a high firing temperature to result in a high electron conductivity. Hence, in the case of firing in an inert atmosphere, the firing temperature is preferably 350° C. to 500° C., and especially preferably 350° C. or higher or 450° C. or lower among others, and 400° C. or higher or 450° C. or lower among others.

Here, in order to allow the raw material powders to completely react to make unreacted phases vanish, it is preferable that the firing be carried out while circulating hydrogen sulfide gas at 500° C. or higher; however, in the case of using raw material powders having a small particle diameter, the firing may be carried out in an inert atmosphere since the reaction is promoted even at a low temperature.

The above raw materials and a fired material are extremely unstable in the air and react with moisture to decompose to thereby generate hydrogen sulfide gas and be oxidized, and therefore it is preferable that a series of operations, specifically, setting the raw materials in a furnace and taking the fired material out from the furnace, be carried out through a glove box or the like whose atmosphere has been replaced by an inert gas atmosphere.

By such a production manner, the formation of sulfur deficiencies can be suppressed and the electron conductivity can be thus lowered. Hence, when an all-solid-state lithium secondary battery is fabricated by using the raw solid electrolyte particle, the charge and discharge characteristic and the cycle characteristic as battery characteristics can be favorable.

Here, since unreacted hydrogen sulfide gas is a toxic gas, it is preferable that the exhaust gas be completely burned by a burner or the like, and thereafter neutralized with a sodium hydroxide solution, followed by discarding in the form of sodium sulfide or the like.

(Surface Modification Treatment)

It is preferable that the surface modification treatment of the raw solid electrolyte particle be carried out by exposing the raw solid electrolyte particle in an atmosphere having a predetermined content of moisture, particularly in an atmosphere having a dew-point temperature in a predetermined range, for a predetermined time, and by carrying out no drying treatment.

The dew-point temperature in a predetermined range is preferably −45° C. to 10° C., and more preferably −35° C. or higher or 0° C. or lower among others, and −30° C. or higher or −10° C. or lower among others.

It is preferable that the dew-point temperature of the atmosphere be regulated by mixing a dry atmosphere having a low dew-point temperature with an atmosphere having a high dew-point temperature, or introducing moisture to a dry air having a low dew-point temperature.

The temperature when the raw solid electrolyte particle is exposed to an atmosphere having a dew-point temperature in a predetermined range is preferably 0° C. to 100° C., and more preferably 10° C. or higher or 80° C. or lower among others, and 25° C. or higher or 45° C. or lower among others.

Further the exposing time at this time is preferably 1 hour to 12 hours, and more preferably 2 hours or longer or 10 hours or shorter among others, and 4 hours or longer or 8 hours or shorter among others.

It is preferable that no drying treatment, for example, no vacuuming, be carried out after the raw solid electrolyte particle is exposed to an atmosphere having a predetermined content of moisture for a predetermined time as described above. This is because when any drying treatment is carried out, the concentration of oxygen, particularly oxygen derived from moisture, in the vicinity of the present solid electrolyte particle surface resultantly decreases.

<Applications of the Present Solid Electrolyte>

The aggregate of the present solid electrolyte particle (referred to as "present solid electrolyte") can be used as a solid electrolyte layer of an all-solid-state lithium secondary battery or an all-solid-state lithium primary battery, a solid electrolyte to be mixed in a positive electrode material or a negative electrode material, or the like.

For example, an all-solid-state lithium secondary battery can be constituted by forming a positive electrode, a negative electrode, and a layer containing the present solid electrolyte between the positive electrode and the negative electrode.

At this time, since the present solid electrolyte is excellent in water resistance and oxidation resistance and therefore exhibits little characteristic deterioration even in handling in a dry air, assembling operations of an all-solid-state lithium secondary battery can be carried out, for example, even in a dry room and the like.

The present solid electrolyte can suitably be used as an electrode material of a lithium secondary battery.

Here, a layer composed of the present solid electrolyte can be fabricated, for example, by a process in which a slurry composed of the present solid electrolyte, a binder and a solvent is dropped on a substrate, and leveled by rubbing with a doctor blade or the like, a process in which the slurry is brought into contact and thereafter blown by an air knife, or a process in which a coating film is formed by a screen printing or the like and thereafter heated and dried to remove a solvent. Alternatively, the layer can also be fabricated by, for example, pressing a powder of the present solid electrolyte to fabricate a green compact, and thereafter suitably processing the green compact.

In the case where the solid electrolyte layer of an all-solid-state lithium secondary battery or an all-solid-state lithium primary battery is formed by using the present solid electrolyte as described above, a positive electrode mixture for forming a positive electrode may be prepared by mixing a positive electrode material and the present solid electrolyte and as required, an electroconductive auxiliary agent and the like. As the positive electrode material, those used as positive electrode active materials of lithium secondary batteries can suitably be used. Examples thereof include oxide-based positive electrode active materials; and in more detail, there can be used lithium-containing composite oxides having a layered rock salt structure, lithium-containing composite oxides having a spinel structure, and combinations of these.

On the other hand, a negative electrode mixture for forming a negative electrode may be prepared by mixing a negative electrode material and the present solid electrolyte, and as required, an electroconductive auxiliary agent and the like. Also as the negative electrode material, those ones used as negative electrode active materials of lithium secondary batteries can suitably be used. Here, since the present solid electrolyte is electrochemically stable, carbon-based materials which are charged and discharged at a less noble potential (about 0.1 V vs Li$^+$/Li) comparable to that of lithium metal can be used, including artificial graphite, natural graphite and non-graphitizable carbon (hard carbon). Hence, by using the carbon-based material as the negative electrode material, the energy density of an all-solid-state lithium secondary battery can be greatly improved. Therefore, a lithium secondary battery can be constituted which has, for example, the present solid electrolyte, and a negative electrode active material containing a carbon such as artificial graphite, natural graphite or non-graphitizable carbon (hard carbon). There can also be used silicon, tin or an oxide of these, which is promising as a large-capacity material.

<Interpretation of Terms>

In the present invention, the "solid electrolyte" means substances in general in which ions such as Li$^+$ can migrate as the substance is in a solid state.

Further in the present invention, the recitation "X to Y" (where X and Y are arbitrary numbers) means, unless otherwise specified, "X or more and Y or less", and also includes meaning of "preferably more than X" or "preferably less than Y".

Further, the recitation "X or more" (where X is an arbitrary number) or "Y or less" (where Y is an arbitrary number) is intended to encompass the meaning of "preferably more than X" or "preferably less than Y".

EXAMPLES

Hereinafter, the present invention will be described by way of Examples. However, the present invention is not any more construed by being limited thereto.

Example 1, Example 2, Example 3, Example 4

Powders of sulfide-based particles having a crystal phase of a cubic argyrodite-type crystal structure having respective compositions indicated in Table 1 were each exposed in a glove box regulated at a dew-point temperature of −30° C. for 6 hours to carry out a surface modification treatment. After the exposure, no drying treatment was carried out. Thus, solid electrolytes (measuring samples) were each obtained.

The dew-point temperature of the atmosphere in the glove box was regulated by regulating the amount of moisture while mixing with air having a high dew-point temperature in the glove box. No particular temperature control was made.

Comparative Example 1, Comparative Example 2, Comparative Example 3, Comparative Example 5

Solid electrolytes (measuring samples) were obtained in the same manner as in Examples, except for altering the powders of the sulfide-based particles to sulfide-based particles having a crystal phase of a cubic argyrodite-type crystal structure having respective compositions indicated in Table 1, and carrying out no surface modification treatment on the sulfide-based particles and storing the sulfide-based particles at a dew-point temperature of −70° C.

Here, as shown in Table 1, Example 1 and Comparative Example 1, Example 2 and Comparative Example 2, Example 3 and Comparative Example 3, and Example 4 and Comparative Example 5 were each compared in terms of the presence/absence of the surface modification treatment on the same composition.

Comparative Example 4

A powder of a sulfide-based particle having a crystal phase of a cubic argyrodite-type crystal structure having a composition indicated in Table 1 was exposed to the air for 1 min and then vacuum dried for 5 min, according to a method described in in Japanese Patent Laid-open No. 2012-94445. Thereafter, the 1-min atmospheric exposure and 5-min vacuum drying in the same manner as above were repeated three times to thereby obtain a solid electrolyte (measuring sample).

(Measurement of the Compositions)

For the sulfide-based particles used in Examples and Comparative Examples, their compositions were determined by ICP atomic emission spectrometry.

(Identification of Formed Phases)

The sulfide-based particles used in Examples and Comparative Examples were analyzed by X-ray diffractometry (XRD) and formed phases were identified.

(Xps Measurement)

For the solid electrolytes (measuring samples) obtained in Examples and Comparative Examples, the ratios of oxygen (O), phosphorus (P), sulfur(S) and a halogen (Ha) at the positions of 100 nm and 5 nm in depth from the particle surface were determined by using XPS. The measurement condition was as follows.

Measuring apparatus: Versa ProbeIII (manufactured by Ulvac-Phi, Inc.)
Excitation X-ray: monochromatic AlKa line (1,486.7 eV)
Output: 50 W
X-ray diameter: 200 μm
Pass energy: 26 eV
Photoelectron escape angle: 45°

(Ar Ion Etching Condition)
Accelerating voltage: 2 kV
Sputter area: 2 mm×2 mm
Etching rate: 8.0 nm/min in terms of SiO$_2$ The measuring samples were each accommodated in a transfer vessel in a glove box whose atmosphere was replaced by an Ar gas (dew point: −60° C. or lower), and thereafter, immediately carried to an XPS apparatus and introduced in the apparatus so as not to be exposed to the air.

The result of Example 1 is shown in Table 2; the result of Comparative Example 1 is shown in Table 3; the result of Comparative Example 4 is shown in Table 4; the result of Example 4 is shown in Table 5; and the result of Comparative Example 5 is shown in Table 6. Further from the measurement results, the results of calculation of the above-mentioned element ratios ($Z_{Ha2}/Z_{Ha1}$), ($Z_{Ha2}/Z_{A2}$), ($Z_{Ha1}/Z_{A1}$), ($Z_{O2}/Z_{A2}$), and ($Z_{O1}/Z_{A1}$) are shown in Table 7.

(D$_{50}$)

The solid electrolytes (measuring samples) (powders) obtained in Examples and Comparative Examples were each added to a nonaqueous solvent by using an automatic sample supply machine (Microtrac SDC, manufactured by Nikkiso Co., Ltd.) for a laser diffraction particle size distribution analyzer, and with the flow rate set at 50%, were irradiated with ultrasonic waves of 30 W for 60 sec; thereafter, the particle size distribution was measured using a laser diffraction particle size distribution analyzer "MT3000II", manufactured by Nikkiso Co., Ltd., and the average particle diameter ($D_{50}$) was determined from the obtained chart of the volume-base particle size distribution.

Here, at the time of measurement, the nonaqueous solvent was filtered through a filter having a pore size of 60 μm, and the average value obtained by making two measurements under the conditions of a solvent refractive index of 1.50, penetration for the particle penetrability conditions, a particle refractive index of 1.59, a non-spherical shape, a measurement range of 0.133 μm to 704.0 μm, and a measurement time of 10 seconds, was defined as $D_{50}$.

<Measurement of the Ionic Conductivity>

The samples (sulfide-based compounds) obtained in Examples and Comparative Examples were each uniaxially press molded at a pressure of 200 MPa in a glove box whose atmosphere was replaced by a sufficiently dried Ar gas (dew point: −60° C. or lower). The resultant was subjected to cold isostatic pressing (CIP) at a pressure of 200 MPa to thereby fabricate a pellet of 10 mm in diameter and 2 mm to 5 mm in thickness. A carbon paste was applied as electrodes on both upper and lower surfaces of the pellet, and thereafter the resultant was heat treated at 180° C. for 30 min to thereby fabricate a sample for measuring the ionic conductivity. The measurement of the ionic conductivity was carried out at room temperature (25° C.) by an alternating-current impedance method, and the results are shown as "Electroconductivity" in Table 1.

<Methods of Fabrication and Use of Lithium Secondary Batteries Using the Present Solid Electrolytes>

(Materials)

As a positive electrode active material, a $LiNi_{0.5}Co_{0.2}Mn_{0.3}O_2$ (NCM) powder ($D_{50}$=6.7 μm), which was a ternary layered compound, was used; as a negative electrode active material, a graphite (Gr) powder ($D_{50}$=20 μm) was used; and as a solid electrolyte powder, one of the solid electrolytes (samples) obtained in Examples and Comparative Examples was used.

A positive electrode mixture powder was prepared by mixing the positive electrode active material powder, one of the solid electrolyte powders and an electroconductive auxiliary agent (acetylene black) in a weight ratio of 60:37:3 in a mortar, and was uniaxially press molded at 20 MPa to thereby obtain a positive electrode material pellet.

A negative electrode material powder was prepared by mixing the graphite powder and the solid electrolyte powder having been subjected to no surface modification treatment (that is, a powder of the sulfide-based particle used in Example 1) in a weight ratio of 64:36 in a mortar.

The lower-side opening of a polypropylene-made cylinder (opening diameter: 10.5 mm, height: 18 mm) whose upper- and lower-sides were opened was closed by a positive electrode (SUS-made), and the positive electrode mixture pellet was mounted on the positive electrode. A standard solid electrolyte powder having been subjected to no surface modification treatment was mounted thereon, and uniaxially pressed at 180 MPa to thereby form a positive electrode mixture and a solid electrolyte layer. The negative electrode mixture powder was mounted thereon; thereafter, a negative electrode (SUS-made) was mounted thereon to close the space in the cylinder; then, the resultant was uniaxially molded at 550 MPa to thereby fabricate a dice battery having a three-layer structure composed of the positive electrode mixture of about 100 μm in thickness, the solid electrolyte layer of about 300 μm and a negative electrode mixture of about 20 μm in thickness.

(Evaluation of the Batteries)

The dice batteries fabricated as described above were each subjected to an electric resistance measurement and a charge and discharge test as follows.

The batteries were each put in an environmental testing machine set at an environmental temperature of 25° C. at which the batteries were charged and discharged, so as to be ready to be charged and discharged, and allowed to stand so that the battery temperature became the environmental temperature.

The charge and discharge of the battery was carried out with 1 mA being regarded as 1C. Then, the battery was charged at 0.1C up to 4.5 V in a constant-current constant-potential charge to thereby obtain an initial charge capacity.

Then, the battery was discharged at 0.1C down to 2.5 V in a constant-current discharge to thereby obtain an initial discharge capacity. An initial charge and discharge efficiency was obtained from the discharge capacity with respect to the charge capacity.

Then, the battery was charged at 0.2C up to 4.5 V in a constant-current constant-potential charge, and thereafter discharged at 5C down to 2.5 V in a constant-current discharge to thereby obtain a discharge capacity at 5C. Initial charge and discharge curves shown in FIG. 1 were obtained in such a way. The initial charge capacity, the initial discharge capacity and the initial charge and discharge efficiency are shown in Table 1. Here, the capacity used herein was that per weight (g) of the positive electrode active material.

A rate characteristic (5C capacity retention rate (%)) was obtained by calculating a proportion of the discharge capacity at 5C while the discharge capacity at 0.1C was taken to be 100%. The rate characteristic is shown in Table 1.

Figure 2:
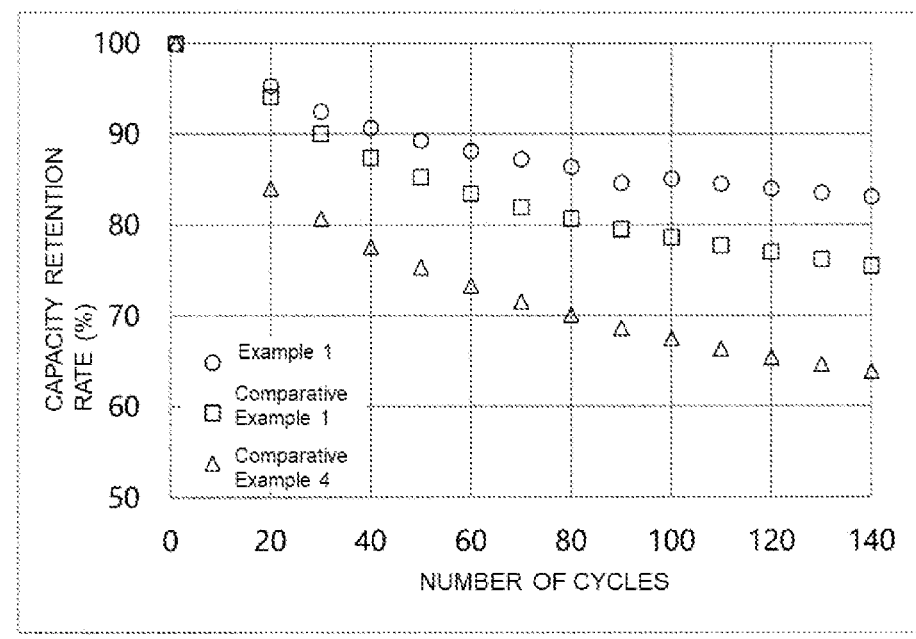
FIG. 2 is graphs indicating capacity retention rates of the samples obtained in Example 1, Comparative Example 1 and Comparative Example 4.

Then, the battery was charged at 1C up to 4.5 V in a constant-current constant-potential charge, and thereafter discharged at 1C down to 2.5 V in a constant-current discharge, and this charge and discharge cycle was repeated 100 cycles. Thereafter, the battery was charged at 0.1C up to 4.5 V in a constant-current constant-potential charge, and thereafter discharged at 0.1C down to 2.5 V in a constant-current discharge to thereby obtain a capacity retention rate relative to the initial discharge capacity. Here, the battery was, at every 10 cycles, charged at 0.1C in a constant-current constant-potential charge, and discharged at 0.1C in a constant-current discharge, and capacity retention rates (%) relative to the initial discharge capacity were determined to thereby obtain graphs in FIG. 2.

TABLE 1

| | Composition | Electroconductivity (mS/cm) | Initial Charge Capacity (mAh/g) | Initial Discharge Capacity (mAh/g) | Initial Charge and Discharge Efficiency (%) | 5C/0.1C Rate Characteristic (%) | Capacity Retention Rate after 100 cycles (%) | $D_{50}$ (μm) |
|---|---|---|---|---|---|---|---|---|
| Example 1 | $Li_{5.8}PS_{4.8}Cl_{1.2}$ | 1.5 | 237.2 | 181.2 | 74.6 | 30.0 | 85.0 | 2.3 |
| Comparative Example 1 | $Li_{5.8}PS_{4.8}Cl_{1.2}$ | 3.0 | 229.6 | 166.0 | 72.3 | 18.1 | 78.7 | 2.3 |

TABLE 1-continued

| | Composition | Electroconductivity (mS/cm) | Initial Charge Capacity (mAh/g) | Initial Discharge Capacity (mAh/g) | Initial Charge and Discharge Efficiency (%) | 5C/0.1C Rate Characteristic (%) | Capacity Retention Rate after 100 cycles (%) | $D_{50}$ (μm) |
|---|---|---|---|---|---|---|---|---|
| Example 2 | $Li_{5.4}PS_{4.4}Cl_{1.6}$ | 0.5 | 237.6 | 175.7 | 73.9 | 23.9 | 85.9 | 3.3 |
| Comparative Example 2 | $Li_{5.4}PS_{4.4}Cl_{1.6}$ | 5.7 | 222.6 | 160.7 | 72.2 | 16.7 | 76.6 | 3.3 |
| Example 3 | $Li_{5.8}PS_{4.8}Cl_{0.6}Br_{0.6}$ | 1.5 | 237.7 | 182.9 | 76.9 | 42.9 | 89.2 | 2.7 |
| Comparative Example 3 | $Li_{5.8}PS_{4.8}Cl_{0.6}Br_{0.6}$ | 2.7 | 239.9 | 178.3 | 74.3 | 22.6 | 82.5 | 2.7 |
| Comparative Example 4 | $Li_{5.8}PS_{4.8}Cl_{1.2}$ | 2.5 | 215.6 | 157.4 | 73.0 | 25.9 | 67.5 | 2.3 |
| Example 4 | $Li_{5.4}PS_{4.4}Cl_{0.8}Br_{0.8}$ | 1.9 | 237.1 | 184.5 | 77.8 | 26.8 | 76.8 | 0.7 |
| Comparative Example 5 | $Li_{5.4}PS_{4.4}Cl_{0.8}Br_{0.8}$ | 5.7 | 232.0 | 175.1 | 75.5 | 19.1 | 75.8 | 0.7 |

TABLE 2

| Depth from Particle Surface (nm) | Element Ratio (%) [ ] indicates an electron orbit | | | | |
|---|---|---|---|---|---|
| | O [1s] | P [2p] | S [2p] | Cl [2p] | A (O + P + S + Ha) |
| 5 | 43.2 | 0.0 | 5.6 | 2.8 | 51.6 |
| 100 | 7.8 | 5.4 | 24.4 | 9.5 | 47.1 |

TABLE 3

| Depth from Particle Surface (nm) | Element Ratio (%) [ ] indicates an electron orbit | | | | |
|---|---|---|---|---|---|
| | O [1s] | P [2p] | S [2p] | Cl [2p] | A (O + P + S + Ha) |
| 5 | 15.3 | 5.8 | 25.0 | 8.6 | 54.7 |
| 100 | 0.7 | 5.8 | 34.6 | 10.2 | 51.3 |

TABLE 4

| Depth from Particle Surface (nm) | Element Ratio (%) [ ] indicates an electron orbit | | | | |
|---|---|---|---|---|---|
| | O [1s] | P [2p] | S [2p] | Cl [2p] | A (O + P + S + Ha) |
| 5 | 23.63 | 5.2 | 20.0 | 7.2 | 56.0 |
| 100 | 2.97 | 5.9 | 33.1 | 9.7 | 51.8 |

TABLE 5

| Depth from Particle Surface (nm) | Element Ratio (%) [ ] indicates an electron orbit | | | | | |
|---|---|---|---|---|---|---|
| | O [1s] | P [2p] | S [2p] | Cl [2p] | Br [3d] | A (O + P + S + Ha) |
| 5 | 39.18 | 1.6 | 6.5 | 2.4 | 2.5 | 52.2 |
| 100 | 13.86 | 5.9 | 24.4 | 6.6 | 5.1 | 55.9 |

TABLE 6

| Depth from Particle Surface (nm) | Element Ratio (%) [ ] indicates an electron orbit | | | | | |
|---|---|---|---|---|---|---|
| | O [1s] | P [2p] | S [2p] | Cl [2p] | Br [3d] | A (O + P + S + Ha) |
| 5 | 7.63 | 6.7 | 26.8 | 6.9 | 5.6 | 53.6 |
| 100 | 1.03 | 6.0 | 32.9 | 7.2 | 6.4 | 53.4 |

TABLE 7

| | $Z_{Ha2}/Z_{Ha1}$ | $Z_{O2}/Z_{A2}$ | $Z_{Ha2}/Z_{A2}$ | $Z_{Ha1}/Z_{A1}$ | $Z_{O1}/Z_{A1}$ |
|---|---|---|---|---|---|
| Example 1 | 0.29 | 0.84 | 0.05 | 0.20 | 0.17 |
| Comparative Example 1 | 0.84 | 0.28 | 0.16 | 0.20 | 0.01 |
| Comparative Example 4 | 0.74 | 0.42 | 0.13 | 0.19 | 0.06 |
| Example 4 | 0.43 | 0.75 | 0.09 | 0.21 | 0.25 |
| Comparative Example 5 | 0.91 | 0.14 | 0.23 | 0.25 | 0.04 |

(Consideration)

From Examples described above and the test results having been carried out so far by the inventors, it has been found that when the sulfide-based solid electrolyte particles having a crystal phase of a cubic argyrodite-type crystal structure composed of lithium (Li), phosphorus (P), sulfur (S) and a halogen (Ha) has a raised oxygen concentration in the vicinity of the particle surface and, on the other hand, has a lowered concentration of a halogen (Ha) therein, a good contact state between the solid electrolyte particle and the active material particle could be secured to thereby improve the rate characteristic and the cycle characteristic as compared with those of the solid electrolyte particles having the same compositions having been subjected to no surface modification treatment.

The invention claimed is:

1. A sulfide-based solid electrolyte particle, comprising a crystal phase of a cubic argyrodite-type crystal structure comprising lithium (Li), phosphorus (P), sulfur(S) and a halogen (Ha),
    wherein the halogen (Ha) includes Cl and Br,
    represented by $Li_{7-x}PS_{6-x}Cl_yBr_z$ and satisfying x=y+z and x=1.0–1.8,
    a ratio ($Z_{Ha2}/Z_{Ha1}$) of an element ratio $Z_{Ha2}$ of the halogen (Ha) at a position, in terms of an $SiO_2$ sputter rate, of 5 nm in depth from the particle surface to an element ratio $Z_{Ha1}$ of the halogen (Ha) at a position, in terms of the $SiO_2$ sputter rate, of 100 nm in depth from the particle surface is 0.5 or lower, as measured by X-ray photoelectron spectroscopy (XPS), and
    a ratio ($Z_{O2}/Z_{A2}$) of an element ratio $Z_{O2}$ of oxygen to a total $Z_{A2}$ of element ratios of phosphorus (P), sulfur(S), oxygen (O) and the halogen (Ha) at the position, in terms of the $SiO_2$ sputter rate, of 5 nm in depth from the particle surface is 0.5 or higher, as measured by XPS.

2. The sulfide-based solid electrolyte particle according to claim 1, wherein a ratio ($Z_{Ha2}/Z_{A2}$) of an element ratio $Z_{Ha2}$ of the halogen (Ha) to a total $Z_{A2}$ of element ratios of phosphorus (P), sulfur(S), oxygen (O) and the halogen (Ha) at the position, in terms of $SiO_2$ sputter rate, of 5 nm in depth from the particle surface is 0.1 or lower.

3. The sulfide-based solid electrolyte particle according to claim 1, wherein a ratio ($Z_{Ha1}/Z_{A1}$) of an element ratio $Z_{Ha1}$ of the halogen (Ha) to a total $Z_{A1}$ of element ratios of phosphorus (P), sulfur(S), oxygen (O) and the halogen (Ha) at the position, in terms of $SiO_2$ sputter rate, of 100 nm in depth from the particle surface is 0.03 to 0.3, as measured by XPS.

4. The sulfide-based solid electrolyte particle according to claim 2, wherein a ratio ($Z_{Ha1}/Z_{A1}$) of an element ratio $Z_{Ha1}$ of the halogen (Ha) to a total $Z_{A1}$ of element ratios of phosphorus (P), sulfur(S), oxygen (O) and the halogen (Ha) at the position, in terms of $SiO_2$ sputter rate, of 100 nm in depth from the particle surface is 0.03 to 0.3, as measured by XPS.

5. An electrode material for a lithium secondary battery, comprising: a sulfide-based solid electrolyte particle according to claim 1; and a positive electrode active material and/or a negative electrode active material.

6. A lithium secondary battery, having a layer comprising a sulfide-based solid electrolyte particle according to claim 1.

7. The sulfide-based solid electrolyte particle according to claim 1, wherein the proportion (z/y) of the molar ratio of Br to the molar ratio of Cl is 0.1 to 10.

8. The sulfide-based solid electrolyte particle according to claim 1, wherein the proportion (z/y) of the molar ratio of Br to the molar ratio of Cl is 0.3 to 3.

9. The sulfide-based solid electrolyte particle according to claim 1, wherein the total molar ratio of Cl and Br is higher than 1.0 and 1.8 or lower.

10. The sulfide-based solid electrolyte particle according to claim 1, wherein the total molar ratio of Cl and Br is higher than 1.2 and 1.6 or lower.

11. The sulfide-based solid electrolyte particle according to claim 1, wherein $D_{50}$ in a volume particle size distribution obtained by a laser diffraction scattering particle size distribution measurement method is 0.1 μm to 10 μm.

* * * * *